INVENTORS
JOHN R. WEST
DONALD E. ROBINSON
BY
ATTORNEYS

Aug. 28, 1962  J. R. WEST ET AL  3,050,925
ROTARY CUTTER
Filed June 18, 1958  3 Sheets-Sheet 2

INVENTORS
John R. West
Donald E Robinson
BY
Strauch, Nolan & Neale
ATTORNEYS

Aug. 28, 1962 J. R. WEST ETAL 3,050,925
ROTARY CUTTER
Filed June 18, 1958 3 Sheets-Sheet 3
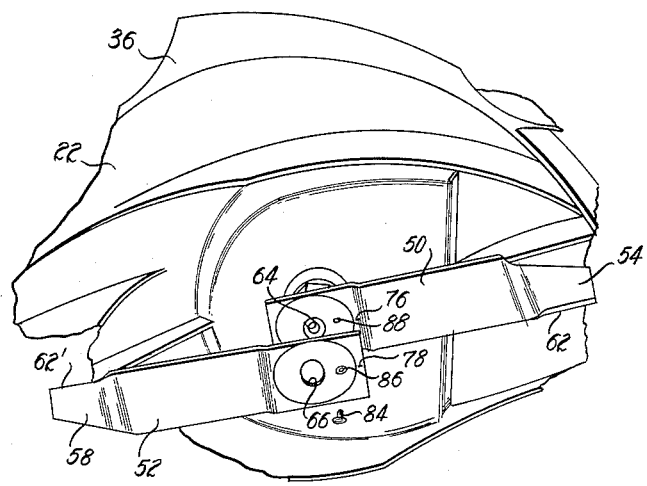
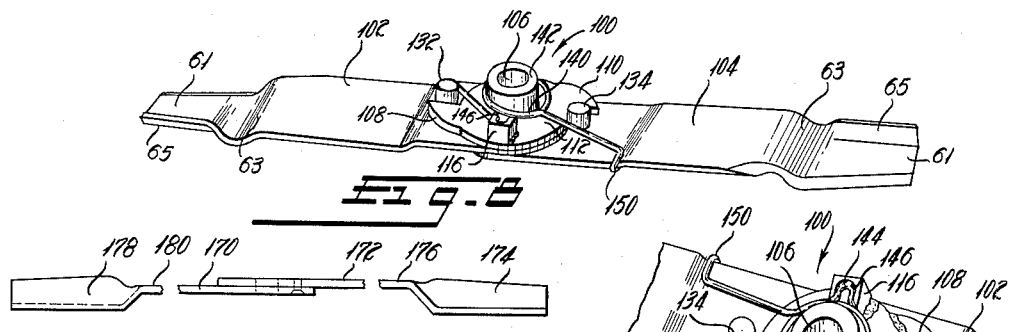
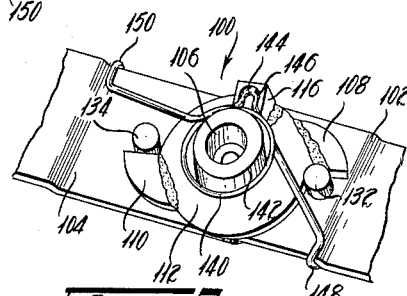
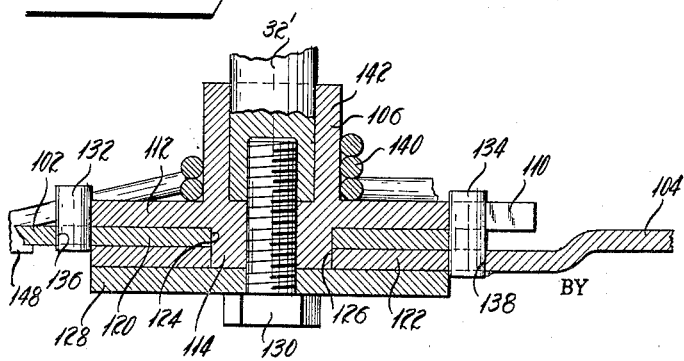
INVENTOR
JOHN R. WEST
DONALD E. ROBINSON
BY
ATTORNEYS

United States Patent Office 3,050,925
Patented Aug. 28, 1962

3,050,925
ROTARY CUTTER
John R. West, Marysville, and Donald E. Robinson, Broadway, Ohio, assignors to The O. M. Scott & Sons Company, Marysville, Ohio, a corporation of Ohio
Filed June 18, 1958, Ser. No. 742,877
15 Claims. (Cl. 56—295)

This invention relates to a rotary blade cutting device in which the blade rotates in the plane of a disk and particularly relates to rotary type lawn mowers in which individual blades are pivotally mounted to relieve stresses placed on the drive shaft extension whenever a blade hits an object.

Since the advent of rotary type lawn mowers, a constant source of trouble has been that due to the rotating blades striking immovable objects, or objects of such mass or weight that detrimental, high stresses are transferred to the driving element. In most rotary mowers (gasoline and electric) the driving element normally includes a motor shaft extension in which undue high stress can easily effect a bend. Several common effects resulting from such a bend in the alignment of the driving shaft extension are (1) the rotating member (blade) can be shifted off center, causing excessive vibrations throughout the entire motor mechanism with eventual structural fatigue and failure; (2) if the bend of the shaft is severe and occurs where the shaft and bearing coact, rotation of the shaft is subjected to a large amount of friction, in some cases resulting in immobility of the shaft; (3) the bend may cause damage to the shaft bearing surface resulting in loss of lubricating oil and eventual failure of the bearing; (4) in some cases the shock or stress which causes a bend in the alignment of the shaft extension will fracture the shaft bearing or the motor housing.

Thus, continued running of a rotary mower with a bent shaft can result in complete bearing failure and, due to vibrations of the unbalanced rotating assembly, ruin other power unit components. In most cases, where the rotating blade has hit an immovable object, replacement at least of the shaft assembly will be necessary for proper mower operation although in less severe cases, the shaft can be machined back to alignment. Either expedient is costly, the latter involving a considerable labor cost, and a new shaft representing approximately 30% of the total cost of the power unit. If the bearing or bearing retaining portion of the power unit housing is fractured, further repair or replacement costs would be necessary.

Many of the first known rotary mowers were not equipped with means for coping with the above outlined problem, but the shaft damage which occurred during their use emphasized the need for some structure or mechanism for eliminating the damage or reducing the tendency. The problem was analysed and the striking of solid or immovable objects with the rotating blade was established as the basic reason for the damage. Previous efforts were directed primarily toward some type of a slip clutch device, apparently based on the assumption that a rotating mass, consisting generally of the unitary double arm type of blade and its driving elements (crank shaft and fly wheel on gasoline motors, or rotor and shaft in electric motors) plus a collet or other coupling structure for mounting the blade on the shaft, produced enough inertia of rotation so when the blade was improperly stopped, the mass momentum imposed a torque or twist on the shaft extension. It was also believed that the kinetic energy of the driving motor supplemented the inertia force and the two combined forces were the basic cause of distortion of the shaft extension.

To eliminate this problem, it became generally recognized that some type of clutch should be utilized to permit continued rotation of the driving source even though the blade was stopped abruptly. However, the use of such clutches have not proved sufficiently effective even though a variety of methods and materials have been employed in slip clutch components including fiber, rubber slip clutch washers and drive disk and shear pin arrangements. These numerous forms of slip clutch mechanism have been and are being used and have become popular with the majority of rotary mower manufactures. However, none of these previously known slip clutch or shear pin systems have eliminated the shaft damage which occurs when the blade hits an iron stake or some other immovable object which results in abrupt stoppage of blade rotation.

From prior art teachings, it appears that at about the same time the slip clutch principle was being developed, an attempted solution along different lines was being considered. This attempted solution involved eliminating the integral blade structure and providing independent cutting members or blade attachments to a rotating member which consisted of a disk or bar. Each blade was mounted on a vertical pivot, offset outwardly from the axis of assembly rotation, which arrangement enabled the blade to swing backward relative to the rotating disk or bar when forced past an obstacle during continued rotation of the driving member. Although the effectiveness of this mechanism has proven to be of some merit, it was necessary, in order for the cutting members to be held in an effective cutting position by the centrifugal force, that the centrifugal force on each blade always exceed the energy required to cut a given amount of grass. Otherwise the independent cutting blade members will be forced to assume a trailing position in which little or no grass cutting action will result.

An additional cumulative disadvantage in this previously known type of pivoted blade mount is in its inherent operation. As the load or resistance offered by the material being cut increases, a reduction in the blade revolutions per minute occurs, less centrifugal force will be developed in the pivoted cutting members, their trailing angle increases and their cutting ability is reduced even further. At this stage, maximum fly wheel effect is lost because, with blades pivoted backwards, the mass of the entire rotating blade assembly must be concentrated nearer the center of rotation. In this condition, where fly wheel effect is lost, a greater amount of driving power is necessary to overcome the resistance of the material being cut and to maintain or again attain the high rate of revolutions per minute necessary to centrifugally swing the blades to the proper cutting positions.

It has been established, during the development of the present invention, that whenever an attempt is made to increase the grass cutting ouput of previously known pivoted blade rotary mowers, the efficiency of the machine diminishes quite rapidly. Besides increasing the complexity of the construction as well as providing opportunity for wear in the blade pivots, previously known pivoted cutting blade combinations require in some instances that the extreme cutting section must be repositioned after hitting the slightest object or if the slightest amount of load is imposed by the material being cut. This latter disadvantageous feature results when blades are mounted for free swinging, entirely unlike a solid cutting action derived from a rotating member with fixed cutting edges.

Accordingly, a primary object of this invention resides in providing a novel rotary cutting blade assembly with blade members secured in such a manner to a rotatable base member that the cutting edges are always spaced a fixed predetermined distance from the assembly axis of rotation and to prevent the entire force developed in the blade assembly, due to the kinetic rotary energy of the blade assembly resolving into an applied force upon abruptly stopping one blade member, from being singularly applied through the entire blade assembly to the assembly mount as a moment about a location offset from the axis of rotation of the blade assembly.

Another object of this invention resides in providing a novel rotary cutting blade assembly with individual cutting blades hinged for pivotal movement on the assembly axis of rotation. In conjunction with this object it is a further object to provide novel means normally constraining such hinged blades in an angular disposition radially disposed from the assembly axis to effect a mass balance about the assembly axis of rotation.

Another object of this invention resides in providing a rotary type power mower with a power unit, e.g. a gasoline engine or electric motor, having a rotatable driving shaft upon which is mounted a rotary cutting assembly with blade pieces hinged on the axis of shaft rotation and constrained to normally rotate with said shaft.

A further object of this invention resides in providing a rotary type power mower with a novel cutting blade assembly having a plurality of radially extended blade members hinged for pivotal movement about the axis of assembly rotation and a blade assembly mounting structure which creates sufficient force at the hinged ends of the bladed members to normally constrain them in a predetermined balanced arrangement about the axis of rotation. In connection with this object it is also an object to provide such a novel blade assembly with a friction loading or resiliently biasing blade member constraining structure.

A still further object resides in providing a novel cutter blade assembly having a collet type coupling, with a cylindrical boss, adapted to be fastened on a rotatable shaft so the cylindrical boss is coaxial with the rotatable shaft, and at least two elongate bladed members pivotally disposed on and normally restrained to a predetermined position relative to the collet boss. In connection with this object, a further object resides in providing the collet coupling with drive lugs, the bladed members with drive pins disposed in the path of rotation of the drive lugs, and spring means connected between the bladed members biasing all of the radial members to predetermined angular positions determined by abutment of the drive pins with the drive lugs.

Still another object resides in providing a rotatable cutting blade assembly having plural independent elongate cutting blade members hinged for restrained pivotal movement about the assembly axis of rotation wherein each bladed member has a blade edge portion formed on one end, a portion with a pivot aperture formed in the other end and at least one of the named portions of at least one blade is offset from the major extent of the bladed member to enable the blade edges of all of the bladed members to rotate in a common cutting plane and dynamically balanced to avoid vibration caused by centrifugal forces and air movement when the pivot ends of all of the bladed members are stacked on a common pivot post. This object can be realized in a novel manner by producing identical bladed members of sheet metal stock and providing an axial offset in each blade equal to one-half the thickness of the metal stock.

A further object resides in providing the aforementioned novel blade assembly with marks on independent blades which are aligned with each other upon proper radial positioning of the blades for mass balance about the assembly axis of rotation. In this regard a still further object resides in providing a shear pin arrangement between the independent blades which can be assembled only when the aforementioned marks are aligned.

Further novel features and other objects of this invention will become apparent from the following detailed description, discussion and the appended claims taken in conjunction with the accompanying drawings showing preferred structures and embodiments, in which:

FIGURE 7 is an exploded perspective view of the two piece blade of this invention wherein a shear pin is used to provide proper diametrical blade alignment;

FIGURE 8 is a perspective top view of a further embodiment of a cutting blade assembly according to this invention;

FIGURE 9 is an enlarged detail view of the hub and blade shank driving portions of the cutter blade assembly shown in FIGURE 8;

FIGURE 10 is a longitudinal vertical section through the cutter blade mounting portion of FIGURE 8; and FIGURE 11 is a detail view illustrating a modified blade piece hinge end construction which can be used in lieu of that illustrated in FIGURE 1.

Figure 1:
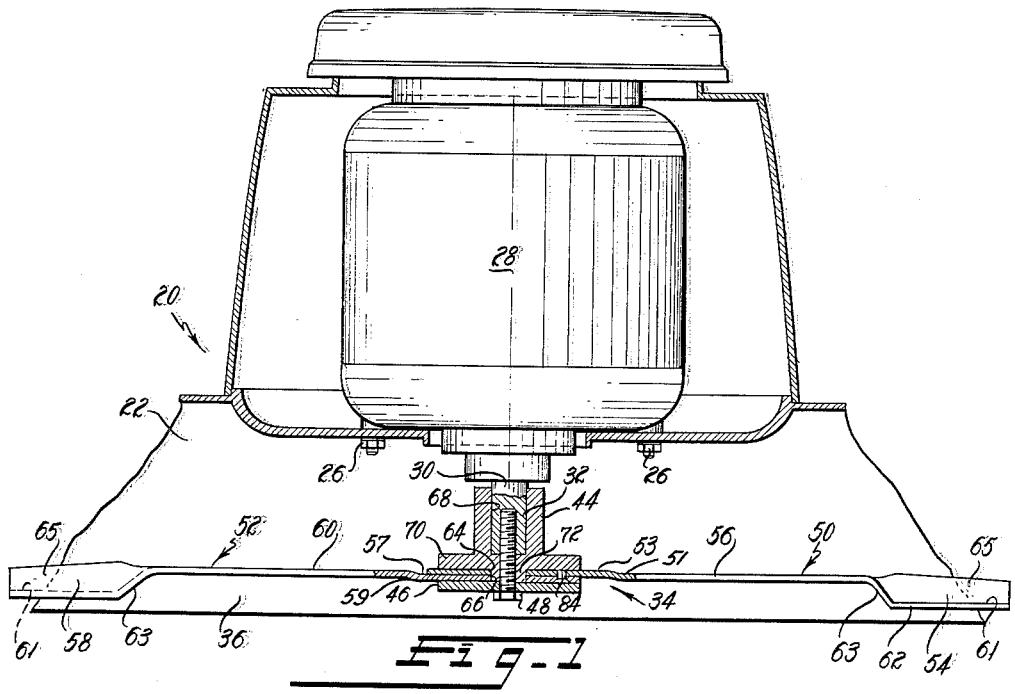
FIGURE 1 is a partially sectioned side view of a rotary mower with the mower housing broken away to show the mower blade assembly and its connection to the motor shaft in accord with the present invention, the preferred construction of the blade pieces with similar but opposite offset hinge ends being shown.

With reference to the drawings, a specific description of the basic inventive concept, the theory behind that concept, and several exemplary embodiments will now be disclosed.

FIGURES 1, 2, 6 and 7 illustrate a rotary blade power mower 20 having a blade housing 22 supported by four ground engaging wheels 24. Centrally secured on the top of housing 22 by studs and nuts 26, is an electric motor 28 with its drive shaft 30 vertically disposed and projecting down to a position under and terminating in an end 32 within the confines of housing 22. A bladed cutter assembly 34 is secured to drive shaft end 32. It is to be understood that the mower may be powered by a small gasoline engine in which the crank shaft has a vertical drive shaft extension with its end terminating below the housing and having secured thereto the bladed cutter assembly 34 in a manner identical to that shown for electric motor 28.

This invention does not involve the specific illustrated mower housing construction, and it is to be understood that the inventive bladed cutter assembly can be utilized in conjunction with many different forms of previously known rotary mower housings. It is deemed sufficient for this disclosure to note that the illustrated housing 22 has dependent sides 36 which extend slightly below the rotary path of the bladed cutter assembly 34 and also provide support for mounting the wheels 24. The symmetrical "front" and "rear" ends 38 and 40 of the housing 22 are open and provided cut grass discharge ports. Both ends being symmetrical, the mower can be pushed in either direction during mowing operations. A handle arrangement (not shown) is pivoted on the top of housing 22 to enable manual pushing of the mower.

The rotary, bladed cutter assembly 34 consists of a two piece hinged blade 42, the ends of each blade piece being coupled to the motor shaft end 32 by a collet 44, retaining washer 46 and screw 48. The blade ends, motor shaft end, collet, retaining washer and screw or their equivalents can for convenience be designated as coupling means. Blade pieces 50 and 52, to provide a common planar cutting path for proper even cutting load, are preferably made with a very slight difference, FIGURE 1, in that the hinge end portion 53 of blade piece 50 is formed with an upward offset 51 relative to the blade piece shank portion 56 and the hinge end 57 of blade piece 52 is formed with a downward offset 59 relative to the shank portion 60 of blade piece 52. By making each of the opposite offsets 51 and 59 equal to one-half the thickness of the shanks of blade pieces 50, 52, the cutting edge 62 and 62' of both blade end portions 54 and 58 will be rotatable in the same cutting plane during rotation of the cutter assembly 34. The inner ends 53 and 57 of both blade piece shanks 56 and 60 are provided with circular apertures 64 and 66, respectively, which enable each blade piece 50 and 52 to be coaxially pivotally mounted, through the medium of collet 44, on the drive shaft end 32.

The blade end portions 54 and 58 of the blade pieces 50 and 52 are tapered as seen in plan view (FIGURE 2) to a reduced tip width to reduce the amount of blade area, adjacent the cutting portion area, which drags over cut grass blades. Each blade end 54 and 58 includes a horizontal leading portion 61 offset below the plane of the shank portions 56 and 60 of the blade pieces 50 and 52 by an abrupt bend 63. The trailing portion 65 of each blade edged end 54 and 58 is curved upwardly and has a slight taper to a narrower upsweep at the extreme tip end. The leading edge of horizontal portion 61 and bend 63 is heat treated and beveled to form the swept back cutting edge 62. The abrupt double bend 63, providing the offset blade ends, and the upswept trailing edge 65 create an extremely strong compound transition between the shank portions 56 and 60 of the blade pieces and the blade ends 54 and 58 which provide rigidly disposed blade ends despite the abrupt bend.

This preferred blade piece construction enables each blade piece to be fabricated in identical shapes and then the hinge end offsets 51 and 59 can be formed in a press. Since each offset 51 and 59 is equal but opposite relative to the entire blade piece both blades piece hinge ends can be offset in the same press, one piece, i.e., 52, being placed upside down relative to the position in which blade piece 50 is placed in the press.

Collet 44 has a bore 68, which enables the collet to fit over the motor shaft end 32, a radial annular flange 70 and a lower axially apertured boss 72 coaxial with bore 68. Boss 72 constitutes a pivot post on collet 44 which projects through the apertures 64 and 66 of the hinge ends 53 and 57 of blade pieces 50 and 52. The combined thicknesses of blade pieces 50 and 52 are slightly greater than the depth of collet boss 72 and will be clamped together on the collet 44 in a friction tight driving fit by pressure between the collet flange 70 and washer 46 when screw 48, threaded in the end of motor shaft 32, is drawn wrench tight.

Because of the aforedescribed pressure tight mounting of the two piece blade 42, the blade pieces 50 and 52, although hinged about the motor shaft axis, are not freely pivotable about that axis. The normal wrench tight pressure fitting of the blade pieces 50 and 52 retains the two pieces in a diametrical balanced relation during normal cutting load without the necessity of a positive drive connection. Alignment marks 76 and 78 in blade pieces 50 and 52 (FIGURE 2) can be placed on the blade pieces in suitable manner, e.g. indented or embossed, to provide a convenient visual check on the diametrically balanced position of the two blades pieces 50 and 52. The illustrated shear pin 84 is not necessary in the assembled structure to realize the basic concept of this invention, the purpose for pin 84 being described hereinafter.

In rotary mower blade assemblies, as was discussed in the introductory portion of this specification, the previously advanced solutions for preventing the damaging effect on the driving shaft of a rotary blade mower upon such rotary blade striking a heavy or immovable object falls into two classes, one of which utilizes a shear pin or some form of clutch attachment between a unitary blade and power unit drive shaft, and the other of which utilizes a blade base piece secured to the drive shaft and has individual blade elements pivotally fastened to the blade base piece. It seems safe to assume that both of these solutions are based on the theory that the rotating mass of the rotatable motive power element (armature and drive shaft in an electric motor and crankshaft and its drive end in a gasoline engine) produce adequate inertia to impose a violent twist on the drive shaft extension when a rotating blade strikes an immovable obstacle. Through tests, applicant has found this theory to be inaccurate and further, that shaft bend can result regardless of how slight a friction or tension is placed in the blade drive connection or how readily a slip clutch may be actuated.

Figure 3:
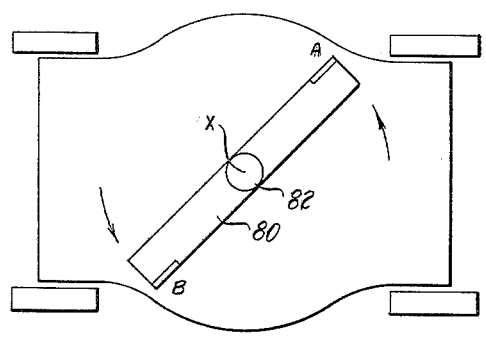
FIGURES 3, 4 and 5 are diagrammatic views to show disposition of forces in a conventional one piece rotary mower blade mounted through a slip clutch arrangement and are included to aid in explaining applicant's analysis of the resolution of forces in such a unitary mower blade upon striking an immovable object.
Figure 4:
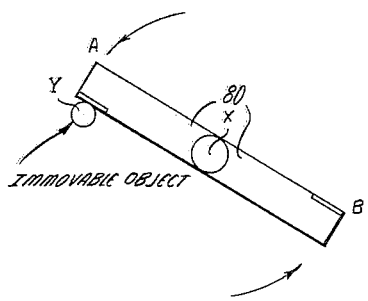
Figure 5:
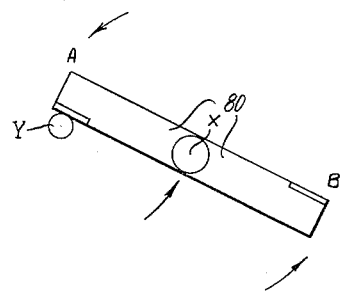

FIGURES 3, 4 and 5 represent a conventional single piece diametrical blade 80 with a friction slip clutch incorporated in the structure 82 which connects the blade 80 to a drive shaft and are used herein in order to illustrate detrimental forces which develope and are transmitted to the drive shaft whenever such a blade strikes an object. When blade 80 is rotating under drive power, as in FIGURE 3, it is known through certain laws of physics (dynamics) that the inertia contained in each of the two blade ends A and B equals a given amount of kinetic energy developed about the axis of rotation X. In FIGURE 4, the introduction of an immovable object Y into the blade path so it is struck by one end A of the single piece cutter blade 80 results in an immediate transfer of kinetic energy from blade 80 to the obstacle Y, stopping rotation of the blade. At this point the rotation of the motor shaft could be either stopped or, if the friction clutch is sufficiently loose, will continue rotation.

The following action occurs regardless of whether the power unit stops or continues rotation. Only the blade end A has hit the obstacle Y, not blade end B. The kinetic energy of blade end A is transferred directly to obstacle Y and at the same time, obstacle Y produces a second fulcrum point about which the unspent kinetic energy of rotation present in blade end B tends to move the entire single piece blade 80 in the direction of the arrows in FIGURE 5. This developed force in the entire blade 80 resolves into a very high momentary lateral force on the end of the motor shaft extension which results in a bent shaft. The forces causing this shaft distortion are not the inertia forces of the driving elements of the drive unit itself. To disprove the old theory of drive component inertia forces being the primary cause of shaft distortion, a blade assembly was made using only one blade piece of applicant's aforedescribed new two piece blade invention. This one blade piece was rigidly secured at its hinge end by rivets to a fixed collet on the drive shaft extension and the rotating single blade piece was directed onto an immovable object which caused an abrupt stopping of the blade and rotating driving element (motor rotor). There were no ill-effects to the shaft extension.

Returning now to the present invention, the two piece-hinged blade provides a counterbalanced blade assembly with the counterbalancing blade masses normally disposed on diametrical sides of the drive shaft axis but not rigidly constrained to each other in movements about the rotative path. This construction eliminates the transfer of large forces between balanced portions of rotating masses due to inertia of one part of the rotating mass upon abrupt stopping of another part of the rotating mass, the amplitude of transferred force being limited to that necessary to overcome the friction fit at the axial hinge point of the diametrical masses.

Figure 2:
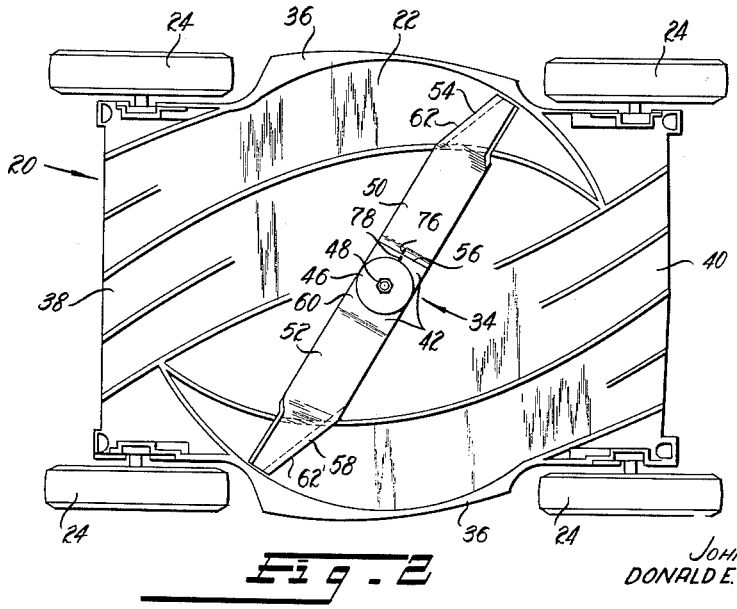
FIGURE 2 is a bottom view of a rotary mower housing showing the cutter blades in plan view.

In normal operative assembly, the two blade pieces 50 and 52 are diametrically disposed as in FIGURE 2. The wrench tight fit of screw 48 creates sufficient friction between the hinge ends of the two blade shanks and the collet 44 and washer 46 to assure constraint of the pieces 50 and 52 to the diametrical position under all normal mowing operations including mowing of heavy stands of grass and impact against small movable objects. All available power is directed to rotation of the blade pieces 50 and 52 as a singular unit 34. With this construction the proper cutting disposition and action of each blade piece, regardless of cutting load, is not dependent upon centrifugal force, hence cannot be affected by changes in rotative speed due to light and heavy cutting loads.

Figure 6:
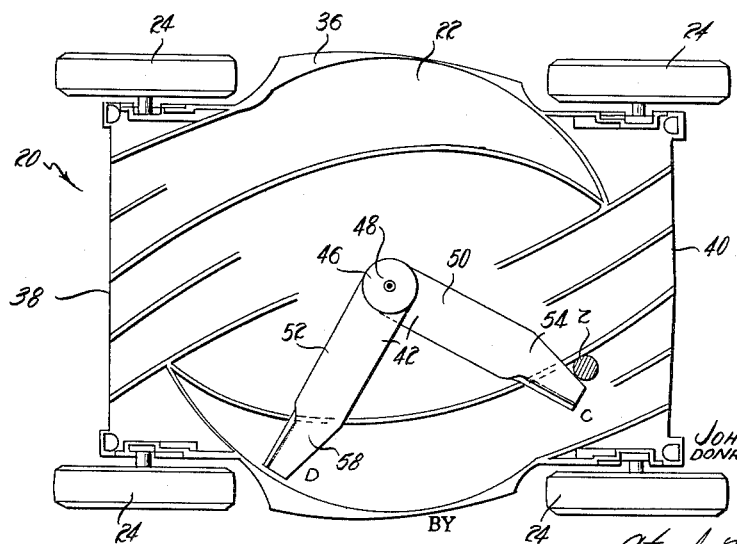
FIGURE 6 illustrates the position of the blade pieces in the mower of FIGURES 1 and 2 after one blade piece has struck a solid object.

Should the blade assembly 34 of FIGURE 2 hit an immovable object Z, see FIGURE 6, the blade piece C will be abruptly stopped, however blade piece D, due to its inertia of rotation will overcome the stationary friction force at its hinge axis on the drive shaft and will continue to rotate a short distance against the friction in the hinge joint to dissipate its kinetic energy relatively gradually rather than abruptly. The motor unit will stall when its drive shaft is stopped which can occur upon impact of blade C with object Z or in attempting to absorb the force necessary to overcome the stationary and running friction of the hinge joint, developed by stopping blade C.

Although the cutter blade assembly 34 which has been described incorporates the basic inventive concept, for operator convenience it is preferable that some device be incorporated in the blade assembly to aid in re-setting the two blade pieces 50 and 52 in exact diametrical relation after an object is struck. If the mower were run with the blades in an unbalanced condition, vibrations and unbalanced bearing load will occur and would eventually result in motor damage. A simple inexpensive bevel headed key or shear pin 84 (FIGURES 1 and 7) can be inserted through accurately located holes 86 and 88 in the hinge portions of blade pieces 50 and 52, respectively, and retained in position as illustrated in FIGURE 1 by the washer 46. Pin 84 will thus assure that the two blade pieces are in accurate diametrical alignment. It is made of relatively soft material which is readily sheared and thus serves only as an alignment device, providing no driving connection between collet 44 and blades 50 and 52. In the event the pin becomes sheared, diametrical alignment of blade pieces 50 and 52 can be ascertained by marks 76 and 78.

*Modification*

A cutter blade assembly in accord with this invention need not be limited to the friction hinge principle described above for absorbing the inertia energy of the free blade when the other blade strikes an object. FIGURES 8 through 10 illustrate a spring action cutter blade assembly 100 in which the two blade pieces 102 and 104 are always maintained in proper diametriacl disposition except when one blade piece strikes an object in which case the free blade inertia energy of rotation dissipates against a resilient spring force. After impact, the free blade returns back to its proper diametrical position under the bias force of the spring, eliminating the necessity for the operator to re-set the blades.

In the spring loaded blade assembly 100, collet 106 is similar to collet 44 of the first described blade assembly 42 however two diametrical locator and drive lugs 108 and 110 are radially disposed and integral with the collet flange 112, the blade piece hinge boss 114 is shorter than hinge boss 72 of collet 44 and a spring anchor 116 is made integral on the upper side of flange 112.

The ends 120 and 122 of blade pieces 102 and 104 are respectively apertured at 124 and 126 (FIGURE 10) for pivotal disposition over the collet boss 114 and the depth of collet boss 114 is such as to enable a close free pivotal fit of the blade pieces 102 and 104 when the blade pieces are retained on the boss 114 by washer 128 and screw 130.

Pins 132 and 134 are force fitted into holes 136 and 138, respectively located in the ends 120 and 122 of blade pieces 102 and 104 and are disposed in the circular path of collet drive lugs 108 and 110. Pins 132 and 134 can be secured in their blade pieces as by welding if so desired. When the pins 132 and 134 abut their respective collet drive lugs 108 and 110, blade pieces 102 and 104 will be accurately located in proper diametrical disposition for balanced rotation as a unit assembly.

To maintain the blade pieces 102 and 104 in the diametrical arrangement, a torsion coil spring 140 with at least two coils is disposed over the collet hub 142. Midway of the spring coils is an anchor loop 144 which fits into a socket 146 (FIGURE 9) in the collet anchor 116. The ends 148 and 150 of torsion spring are hooked and, in the assembled blade, are biased against spring force in the coils and hooked over the edges of respective blade pieces 102 and 104 to bias the blade piece pins 132 and 134 into engagement with the collet locator and drive lugs 108 and 110. Although the collet spring anchor 116 and the spring loop 144 could be deleted, they serve to provide a direct spring action on each blade piece independent of the other blade piece.

Screw 130 secures the cutter blade assembly 100 on the drive shaft end 32' in the same manner as in the first described embodiment.

Cutter assembly 100 can be modified by deleting the spring 140 and providing a wrench tight friction drive fit, as in FIGURE 1, between the collet flange 112, the hinge ends 120 and 122 of blade pieces 102 and 104, and washer 128. In such case, the free blade which becomes displaced upon abrupt stopping of the other blade, due to its inertia, will not automatically return to its proper position, however the user can readily re-set the displaced blade back to a proper angular position, determined by abutment of pin 132 or 134 against its appropriate collet lug 108 or 110 by a mallet, hammer or suitable tool without the necessity of removing the screw 130.

A still further manner of fabricating the two blade pieces to assure cutting edge travel in a common plane is illustrated in FIGURE 11. In this instance, each blade piece 170 and 172 is made in a different manner and there is no offset at the hinge end of either blade piece. The blade shank portion 174 of blade piece 172 is formed to locate the cutting edge of blade tip portion 178 in the plane of the cutting edge of blade tip 174 in dynamic balance. By making this difference in blade tip offset equal to the thickness of the shanks of blade pieces 170 and 172, the cutting edges of both blade tip portions 174 and 178 will be disposed and rotatable in the same plane.

It is further noted that more than two blades can be utilized in the cutter assembly, e.g., three or four blades can be used, it being necessary to make certain that the cutting edges rotate in a common plane and that the angular disposition of the blades provide a total mass balance.

The foregoing description fully discloses cutter blade assemblies, for use in rotary type power mowers, which utilizes a two piece blade hinged at the rotation axis. Such construction is advantageous over all previously known mower blade assemblies in that radial blade position is unaffected by cutting load and that upon one blade striking an immovable object, the unrestricted blade piece is allowed to continue a limited rotation without subjecting the drive shaft extension to undue stress.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A rotary cutting blade assembly for use in combination with a rotatable member comprising: at least two elongate blade pieces, each having a cutting edge at one end and having an aperture enabling a pivot connection at the other end; and means, adapted to be secured to the rotatable member, to pivotally secure all said blade pieces by means of the apertures at said other ends of said blade pieces for restrained relative pivotal movement about a common axis coextensive with the axis of rotation of the blade assembly.

2. A power mover or the like of the rotary blade type comprising: a housing with ground engaging wheels; a power unit mounted on said housing with a rotatable power member projecting to the lower side of said housing; a rotary cutting blade assembly secured for rotation on the lower end of said power member including blade pieces always extending radially from the axis of rotation of said power member, each of said blade pieces being an integral unit, and means coupling both of said blade pieces to said power member for rotation about the rotational axis of said power member and hinging each blade piece for restrained pivotal movement relative to each other about the axis of rotation of said blade assembly supplemental to rotation of said blade assembly.

3. A cutting blade assembly for cutting devices or the like having a power driven rotatable member, comprising: radially disposed blade pieces; and coupling means including one end of each said blade piece adapted to secure said one ends of all of said blade pieces to the power driven rotatable member to enable rotation of said coupling means and said blade pieces about the axis of rotation of the rotatable member as an assembly and enabling restrained supplemental relative pivotal movement of said blade pieces about said axis upon application of a force external of said member on one of said blade pieces.

4. A cutting blade assembly as defined in claim 3, said coupling means includes a friction clamping means coacting with and frictionally constraining the hinged ends of said blade piece to normally rotate as a unit with said coupling means.

5. A cutting blade assembly, as defined in claim 3, wherein means located at the radially inner ends of said blade pieces provide a releasable structural connection between all blade pieces restraining each blade in angular position relative to each other within predetermined limits of torque between said blade pieces.

6. A cutting blade assembly as defined in claim 3 wherein the radially inner ends of each of said blade pieces include stop devices and are hinged on said coupling means coaxial with the axis of rotation of the blade assembly and said coupling means includes limiting stop members associated with and disposed in the path of movement of said stop devices which occurs when either of said blade pieces are subject to a force moving them relative to said coupling means about their hinge axes, and resilient biasing means connect with said blade pieces and coact with said coupling means to bias said blade pieces about their hinge axes to a position determined by abutment of the blade stop devices with associated stop members on the coupling means.

7. A cutting blade assembly for powered rotary mowers or the like having a power driven rotatable member, comprising: a coupling means having means adapted to be secured to and rotated by the rotatable member and including a pivot post means coaxial with the axis of rotation of said coupling means; a plurality of elongate members each having a blade edge at one end and means at the other end disposed for pivot movement of each elongate member coaxial with and on said pivot post means; and means between said coupling means and said elongate members constraining all of said elongate members to normally rotate as a unit with said coupling means.

8. A cutting blade assembly as defined in claim 7, wherein said coupling means includes a collet with a coaxial boss as said post means, and said means constraining all of said elongate members to rotate as a unit comprises a radial flange at the base of said boss, a friction washer over said boss, and means to clamp said elongate members and said friction washer as an assembly against said radial flange in a friction tight fit.

9. A cutting blade assembly as defined in claim 8, wherein each of said other ends of said elongate members are apertured, the apertures being disposed eccentric to to the assembly rotational axis and being in juxtaposed coalignment when said elongate members are in a predetermined angular disposition on said pivot post means, and a shear pin made of soft material is disposed in said other ends through the coaligned apertures.

10. A cutting blade assembly as defined in claim 8, wherein means are provided on the pivot ends of said elongate members constituting visible marks which are aligned when said elongate members are disposed in a predetermined and balanced angular disposition.

11. A cutter blade assembly for powered rotary mowers or the like having a power driven rotatable member, comprising: a coupling means, adapted to be secured to and rotate with the rotatable member, including a pivot post means coaxial with the axis of rotation of the coupling means; a plurality of elongate members, each having a flat apertured portion at one end and a blade edge portion formed adjacent the other end, said blade members being stacked with said flat apertured ends disposed in hinged relationship on said pivot post means; at least one of said portions of at least one of said elongate members being shaped to provide a common planar cutting path and dynamic balance for said blade edge portions; and means included in said coupling means retaining said elongate members on said pivot post means in radial disposition thereto and normally constraining said elongate members to a predetermined angular relationship with one another.

12. A cutter blade assembly as defined in claim 11 wherein said elongate members are identical in shape excepting that the flat hinge end of at least one elongate member is formed essentially parallel to the major portion of the elongate member and offset in a direction parallel to the axis of assembly rotation an amount at least approximately equal to one-half the thickness dimension of said flat hinge end.

13. A cutter blade assembly as defined in claim 12 wherein at least two elongate members are used and the flat hinge end of one of said two elongate members has said offset substantially equal to the thickness dimension of said flat hinge end.

14. A cutter blade assembly as defined in claim 12 wherein at least two elongate members are used and the flat hinge end of each of said two elongate members have equal but opposite said offsets substantially equal to one-half the thickness dimension of said flat hinge ends.

15. A cutter blade assembly as defined in claim 11, wherein at least two of said elongate members are used and each member has its blade edge portion disposed in a plane parallel to the flat hinge end but offset in a direction parallel to the axis of assembly rotation, said blade edge portion offset in one of said two elongate members being greater than the blade edge portion offset in the other of said two elongate members by a dimension substantially equal to the thickness dimension of said flat hinge ends.

References Cited in the file of this patent

UNITED STATES PATENTS

| | | |
|---|---|---|
| 1,855,832 | Hind | Apr. 26, 1932 |
| 2,034,505 | Cline | Mar. 17, 1936 |
| 2,715,307 | Carter | Aug. 16, 1955 |
| 2,822,657 | Chaffee | Feb. 11, 1958 |
| 2,856,747 | Kolls | Oct. 21, 1958 |
| 2,864,420 | Schmidt | Dec. 16, 1958 |